United States Patent

Kadowaki

[15] 3,643,896
[45] Feb. 22, 1972

[54] DEVICE FOR SWITCHING BETWEEN FILM ADVANCE AND FILM REWIND IN MOVIE PROJECTORS

[72] Inventor: Tatsusuke Kadowaki, Yokohama, Japan
[73] Assignee: Kabushiki Kaisha Ricoh, Tokyo, Japan
[22] Filed: Sept. 10, 1970
[21] Appl. No.: 70,696

[30] Foreign Application Priority Data

Sept. 20, 1969 Japan..................................44/74351

[52] U.S. Cl..............................242/205, 74/810, 74/220, 352/166
[51] Int. Cl...................................B11b 15/32, G03b 1/04
[58] Field of Search..................242/201, 205; 352/166, 168, 352/173, 180; 74/810, 812, 220, 225, 226

[56] References Cited

UNITED STATES PATENTS

| | | | |
|---|---|---|---|
| 2,647,435 | 8/1953 | Nemeth | 242/201 X |
| 2,907,531 | 10/1959 | Badgley | 242/205 |
| 3,061,219 | 10/1962 | Groves | 242/205 |
| 3,016,210 | 1/1962 | Ecker et al | 242/205 |
| 3,159,841 | 12/1964 | Castedello et al. | 352/104 |
| 3,527,427 | 9/1970 | O'Donnell | 242/205 |

Primary Examiner—Leonard D. Christian
Attorney—McGlew and Toren

[57] ABSTRACT

A device for switching between film-advancing and film-rewinding operations of a movie projector, having a main shaft included in the film-driving means, comprises respective wheels secured to rotate with the supply reel-mounting spindle and the takeup reel-mounting spindle. A support is slidably mounted between these wheels, and carries a pair of pulleys rotatably mounted at respective opposite ends thereof and each adjacent a respective wheel. A drive pulley is mounted on the main shaft for rotation therewith, and an endless belt is trained around the drive pulley and the two pulleys on the support. The direction of tension in the belt changes in accordance with the direction of rotation of the main shaft, to shift the support in the direction of the tension to effect driving of a respective spindle wheel by the belt through rotation of the adjacent pulley. A reversing wheel is rotatably mounted between one spindle wheel and its associated pulley. Either the takeup reel or the supply reel is selected automatically for driving in response to the direction of rotation of the main shaft.

8 Claims, 3 Drawing Figures

PATENTED FEB 22 1972

3,643,896

INVENTOR.
TATSUSUKE KADOWAKI
BY McGlew and Toren
ATTORNEYS 3,643,896

DEVICE FOR SWITCHING BETWEEN FILM ADVANCE AND FILM REWIND IN MOVIE PROJECTORS

BACKGROUND OF THE INVENTION

It is already known to move a film in a direction opposite to the normal direction of movement, when the film is screened by a projector, so as to provide a comical effect of the projected image. On the other hand, it is necessary to rewind the film from the takeup reel onto the supply reel in order to be ready for the next screening when projection of a film has been completed.

For this purpose, it has hitherto been customary to use a clutch mechanism, in conventional movie projectors, for moving an intermediate gear or an intermediate friction wheel so as to render one of the film supply reel and film takeup reel operative and the other inoperative. Rotation direction control means, such as a triangular annular clutch, for example, for regulating the direction of rotation of the film supply reel, when the film is advanced, and for regulating the direction of rotation of the film takeup reel, when the film is to be rewound, have been necessary. Known arrangements require a multiplicity of separate components which inevitably complicate the structure and make it difficult, if not impossible, to reduce the overall size of a movie projector to a compact size.

SUMMARY OF THE INVENTION

This invention relates to movie projectors and, more particularly, to a novel, simplified for improved device where switching between film-advancing and film-rewinding operations.

In accordance with the invention, he change in the direction of tension of a belt for transmitting rotation of the main shaft to rotation of reel drive means, which change in tension direction takes place responsive to change in the direction of rotation of the main shaft, is utilized to effect automatic switching of the reel driving from the pickup reel to the supply reel, or vice versa.

More specifically, each of the two reel-mounting spindles is provided with a respective wheel rotatable therewith. A support is slidably mounted between the tow wheels and carries a pair of pulleys rotatably mounted thereon at respective opposite ends thereof, each pulley being adjacent a respective spindle wheel. A drive pulley is mounted on the main shaft for rotation therewith, and an endless belt is trained around the three pulleys so that all three pulleys are driven from the main shaft. The direction of tension in the endless belt, which changes in accordance with the direction of rotation of the main shaft, shifts the support in the direction of tension to effect driving of a respective spindle wheel by the belt through rotation of the adjacent respective pulley. Preferably, a rotatable reversing wheel is interposed between one spindle wheel and the associated pulley on the support.

An object of the invention is to provide an improved and simplified device for switching automatically between film-advancing and film-winding operations in a movie projector.

Another object is to provide such a device which is simple and inexpensive in construction, comprises relatively few components, and is adapted to mass-production techniques.

A further object of the invention is to provide such a device which operates automatically responsive to change in the direction of rotation of a main shaft forming part of the film-driving mechanism.

Another object of the invention is to provide such a device in which the spindle wheels may be driven either frictionally or through intermeshing gears.

A further object of the invention is to provide such a device which does not require any special means to regulate or select the direction of rotation of the film supply reel spindle or the takeup reel spindle.

For an understanding of the principles of the invention, reference is made to the following description of a typical embodiment thereof as illustrated in the accompanying drawings.

DESCRIPTION OF THE PREFERRED EMBODIMENT

Figure 1:
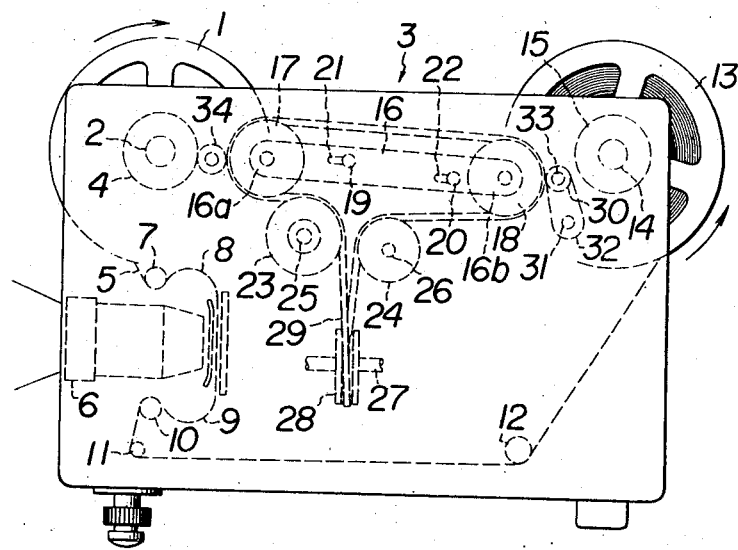
FIG. 1 is a side elevation view of a movie projector embodying the invention.

Referring to FIG. 1, a film-supply reel-mounting spindle 2, for mounting a supply reel 1 for movie film, is rotatably mounted on a sidewall of a projector 3, and a wheel 4 is formed integrally or secured fixedly to spindle 2 at the inner end of the latter. A movie film 5, paid out from supply reel 1, is guided by a guide wheel 7 disposed above a projection lens 6 to form a loop 8, and is moved along the rear end of projection lens 6 to form a loop 9. Thereafter, film 5 is guided by guide wheels 10, 11 and 12 and wound up on a film takeup reel 13. The illustrated path of movement of the film is similar to that in conventional movie projectors.

Takeup reel 13 is mounted on a takeup reel-supporting spindle 14 rotatably mounted on the same sidewall of projector 3 as that on which supply reel-mounting spindle 2 is rotatably mounted. Like spindle 2, spindle 14 has a wheel 15 formed integrally therewith, or fixedly secured thereto, and disposed at its inner end.

A pulley support 16 is arranged between wheels 4 and 15 and rotatably supports, through shafts, a pulley 17, at its forward end 16a, and a pulley 18, at its rearward end 16b. Pulley support 16 is suitably mounted for reciprocation longitudinally of the projector on the sidewall of the projector supporting the spindles 2 and 14, as by loosely receiving, in slots 21 and 22 formed in support 16, respective rivets 19 and 20 secured to the inner surface of the projector sidewall.

Pulleys 23 and 24, arranged for rotation in a plane extending longitudinally of the projector, are rotatably mounted below support 16, and are supported by respective shafts 25 and 26 secured to the inner surface of the aforementioned sidewall of projector 3. A pulley 28 is secured to a main shaft 27 of projector 3, and which shaft includes a shutter plate (not shown) mounted at its forward end in the same manner as in conventional movie projectors. An endless belt 29, trained about pulley 28 as if pulley 28 were hung from the endless belt, is also trained about pulleys 23, 17, 18 and 24.

Figure 2:
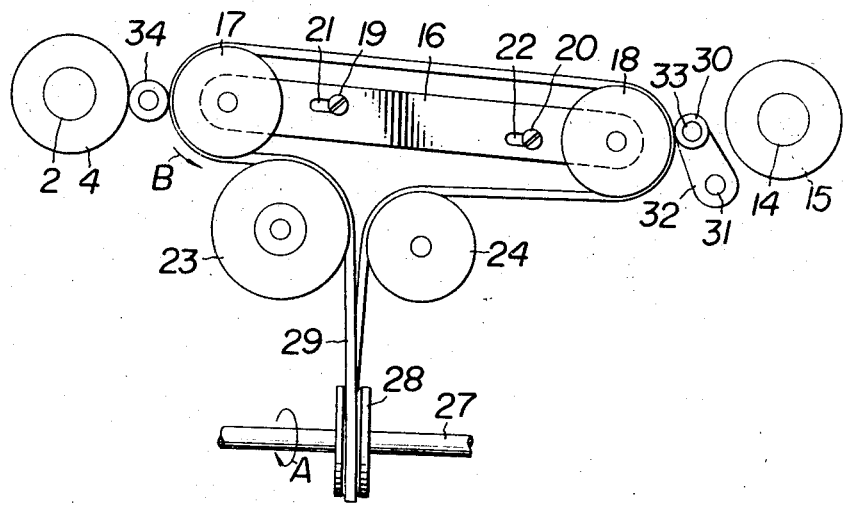
FIG. 2 is a side elevation view of one embodiment of switching device in accordance with the invention, illustrating the device in the state in which film is rewound from the takeup reel to the supply reel.
Figure 3:
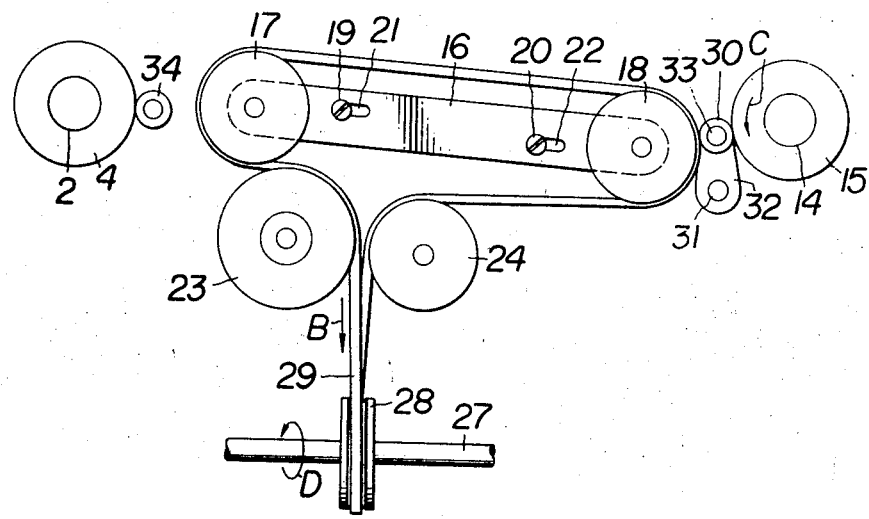
FIG. 3 is a view similar to FIG. 2 but illustrating the device in the state in which it has been switched from the film-rewinding operation to the film-advancing operation.

Main shaft 27 is adapted to rotate in the direction of the arrow A in FIG. 2 when the film is moved in a normal direction, or advanced, for screening, and is rotated in the direction of the arrow D of FIG. 3, when the film is moved in a reverse or rewind direction for either screening or rewinding. An intermediate roller 30 is arranged between rearmost pulley 18 and wheel 15, and is rotatably supported by a shaft 33 on the free end of an arm 32 pivotally supported at its based end by a shaft 31 attached to the inner surface of the above-mentioned sidewall of projector 3. Roller 30 acts as a reversing roller between pulley 18 and wheel 15.

Wheel 4, pulleys 17 and 18, intermediate roller 30 and wheel 15 are disposed in the same vertical plane. As illustrated in FIGS. 1 and 2, that portion of endless belt 12 which is maintained in intimate contact with the forward portion of the circumference of pulley 17 is brought into contact with wheel 4, through an intermediate roller 34, when support 16 has moved forwardly. Similarly, that portion of endless belt 29 which is maintained in intimate contact with the rearward portion of the circumference of pulley 18 is brought into contact with wheel 15 through intermediate roller 30 when pulley support 16 is moved rearwardly.

The switching device operates in a manner which will now be described. If main shaft 27 is rotated in the direction of arrow A of FIG. 2, or in the direction in which the film is advanced or moved in its normal direction during screening, when the switching device is in the state shown in FIG. 2, then belt 29 moves in the direction of arrow B. Pulley 17 is moved rearwardly, or to the right as viewed in FIG. 2, by the tension of belt 29 exerted between drive pulley 28 and pulley 17. The rearward movement of pulley 17 causes support 16 to move rearwardly, in a sliding motion as guided by rivets 19 and 20, into the position shown in FIG. 3. As support 16 moves rearwardly, the portion of belt 29 maintained in contact with the rearward portion of the circumference of pulley 18 moves intermediate roller 30 into pressing engagement with wheel 15. Accordingly, wheel 15 is rotated, through intermediate roller 30, in the direction of the arrow C, of FIG. 3 by belt 29 moving in the direction of the arrow B. Film takeup reel 13 (FIG. 1), which is fixed to rotate with wheel 15, is rotated in the direction of arrow C. With the switching device in this state, belt 29 is released from engagement with wheel 4 and no longer rotates this wheel, film supply reel 1 thus rotating in an idling motion.

As the film advancing operation progresses, the diameter of the roll of film formed on the film takeup reel increases. Since, however, the rate of movement of the film is constant, it is necessary to reduce the rate or rotation of the film takeup reel as the diameter of the roll of film formed thereon increases. In conventional movie projectors, it has hitherto been customary to frictionally connect the takeup reel spindle to the drive means for causing a slip to occur between these components.

In movie projectors embodying the present invention, takeup reel spindle 14 may be frictionally connected to wheel 15 by suitable means. In accordance with the present invention, frictional connection is maintained between wheel 15 and intermediate roller 30, or between intermediate roller 30 and belt 29, even if wheel 15 and spindle 14 are formed completely integral with each other. This eliminates the need to provide special means for frictionally connecting the takeup reel spindle to the drive means.

If main shaft 27 is rotated in the direction of arrow D in FIG. 3, for screening the film in the reverse direction or for rewinding the film, belt 29 moves in a direction opposite to that indicated by arrow B. This causes support 16 to move forwardly, or to the left, from the position shown in FIG. 3 into the position shown in FIG. 2, by virtue of the tension of belt 29 moving between the drive pulley 28 and pulley 18. When support 16 is in the position shown in FIG. 2, that portion of belt 29 engage with the forward portion of circumference of pulley 17 presses through intermediate roller 34, against wheel 4 to rotate wheel 4 clockwise. This causes film supply reel 1 (FIG. 1) to rotate in the direction of the arrow shown in FIG. 1, for rewinding the film thereon from the film takeup reel 13 which now rotates in an idling motion.

While the film-supply reel-supporting spindle 2 and the film takeup reel-supporting spindle 14 have been described as being driven by frictional transmission of rotation, it will be understood that a gear may be formed integral with, or fixed to, each of the pulleys 17 and 18, spindle 2 and spindle 14, so that the two reel spindles 2 and 14 can be rotated by a gear transmission of rotation while regulating the extent of sliding movement of support 16. Furthermore, pulleys 23 and 24 may be omitted or their positions may be changed as desired, depending on the direction of rotation of spindle 2 and spindle 14.

From the foregoing description, it will be appreciated that, in the present invention, pulleys, for transmitting the rotation of the main shaft by means of an endless belt, are movably supported by a support movable longitudinally of the movie projector, and which support is moved backwardly and forwardly by utilizing a change in the direction of tension of the belt caused by a change in the direction of rotation of the main shaft. Thereby, the film reel spindles can be selectively adapted for rotation either to advance the film or to rewind the film.

The switching device constructed and operated as described has many advantages. Thus, a movie projector incorporating the invention can omit a pulley actuating mechanism such as required in conventional projectors. Besides, no special means need be provided for regulating the direction of rotation of the film-supply reel-supporting spindle and the film takeup reel-supporting spindle, since the supply reel-supporting spindle is allowed to rotate idly when the main shaft rotates in a normal direction and the film takeup reel support spindle is permitted to rotate idly when the main shaft rotates in a reverse direction. The switching device in accordance with the invention is simple in construction and positive in operation, and can be produced at low cost by mass-production techniques.

While a specific embodiment of the invention has been shown and described in detail to illustrate the application of the principles of the invention, it will be understood that the invention may be embodied otherwise without departing from such principles.

What is claimed is:

1. In a movie projector having a film-supply reel-mounting spindle, a film takeup reel-mounting spindle, and film-driving means including a rotatable main shaft, a device for switching between film-advancing and film-rewinding operations comprising, in combination, respective first wheels secured to rotate with said spindles to rotate respective reels mounted thereon; a support slidably mounted between said first wheels for reciprocation relative thereto; a pair of second wheels rotatably mounted on said support at respective opposite ends thereof, each adjacent a respective first wheel; a drive pulley mounted on said main shaft for rotation therewith; and an endless belt trained around said drive pulley, extending toward opposite ends of said support, and in driving relation with both said second wheels; the direction of tension in said endless belt being changed in accordance with the direction of rotation of said main shaft to shift said support in the direction of the tension to effect driving of a respective first wheel by said belt through rotation of the adjacent respective second wheel.

2. In a movie projector, a switching device as claimed in claim 1, in which said second wheels are pulleys having said endless belt trained therearound; selective driving of a respective first wheel being effected by frictional engagement between the selected first wheel and that portion of said endless belt trained around the adjacent pulley.

3. In a movie projector, a switching device as claimed in claim 1, including a rotation direction-reversing third wheel interposed between one of said first wheels and the adjacent second wheel.

4. In a movie projector, a switching device as claimed in claim 3, in which said third wheel is interposed between the first wheel secured to said takeup reel-mounting spindle and the adjacent second wheel.

5. In a movie projector, a switching device as claimed in claim 4, in which said third wheel is rotatably mounted at the free end of a pivotally supported arm and is continuously driven by said belt through rotation of the adjacent respective second wheel.

6. In a movie projector, a switching device as claimed in claim 2, in which said support is an elongated slide mounted on said projector through the medium of a pair of elongated slots in said slide having engaged therein respective pin members on said projector.

7. In a movie projector, a switching device as claimed in claim 2, in which said main shaft extends parallel to the direction of reciprocation of said support; and a pair of intermediate pulleys each interposed between said drive pulley and a respective pulley on said support, and having said endless belt trained therearound.

8. In a movie projector, a switching device as claimed in claim 1, in which all of said first and second wheels are rotatable in a common plane.

* * * * *